(12) United States Patent
Fujiwara et al.

(10) Patent No.: US 11,379,801 B2
(45) Date of Patent: Jul. 5, 2022

(54) MAINTENANCE SUPPORT SYSTEM AND MAINTENANCE SUPPORT METHOD

(71) Applicant: TLV Co., Ltd., Kakogawa (JP)

(72) Inventors: Yoshiyasu Fujiwara, Kakogawa (JP); Kazunori Oda, Kakogawa (JP); Yoshio Miyamae, Kakogawa (JP); Hiroki Kawahara, Kakogawa (JP)

(73) Assignee: TLV Co., Ltd., Kakogawa (JP)

(*) Notice: Subject to any disclaimer, the term of this patent is extended or adjusted under 35 U.S.C. 154(b) by 293 days.

(21) Appl. No.: 15/564,249

(22) PCT Filed: Feb. 15, 2016

(86) PCT No.: PCT/JP2016/054274
§ 371 (c)(1),
(2) Date: Oct. 4, 2017

(87) PCT Pub. No.: WO2016/163154
PCT Pub. Date: Oct. 13, 2016

(65) Prior Publication Data
US 2018/0130029 A1 May 10, 2018

(30) Foreign Application Priority Data
Apr. 7, 2015 (JP) .............................. JP2015-078439

(51) Int. Cl.
*G06Q 10/00* (2012.01)
*G06Q 10/06* (2012.01)
*G06Q 50/06* (2012.01)

(52) U.S. Cl.
CPC ............ *G06Q 10/20* (2013.01); *G06Q 10/00* (2013.01); *G06Q 10/063114* (2013.01); *G06Q 50/06* (2013.01)

(58) Field of Classification Search
CPC .......... G06Q 10/20; G06Q 10/063114; G06Q 50/06; G06Q 10/06
See application file for complete search history.

(56) References Cited

U.S. PATENT DOCUMENTS 6,571,180 B1 * 5/2003 Turner ...................... F16T 1/48
702/45
7,103,460 B1 * 9/2006 Breed ................. B60C 23/0408
701/29.1

(Continued)

FOREIGN PATENT DOCUMENTS

CN 110334728 A * 10/2019
JP 749712 A 2/1995

(Continued)

OTHER PUBLICATIONS

Paprocka, Iwona, Kempa, Wojciech, and Cwikla, Grzegorz, "Predictive Maintenance Scheduling with Failure Rate Described by Truncated Normal Distribution", Sensors (2020), retrieved Aug. 6, 2021 (Year: 2020).*

*Primary Examiner* — Sarah M Monfeldt
*Assistant Examiner* — Andrew Chase Lakhani
(74) *Attorney, Agent, or Firm* — The Webb Law Firm (57) ABSTRACT

A maintenance support system for a plurality of maintenance-target apparatus in a plant includes a maintenance information delivery unit that delivers maintenance information Im that indicates an operational status of each maintenance-target apparatus to maintenance personnel every preset time T, wherein the maintenance information delivery unit delivers predictive information If to the maintenance personnel at a specified time Tf between the previous delivery of the maintenance information Im and the next delivery of the maintenance information Im, the predictive information If providing predictions regarding the opera- (Continued)

tional status of each maintenance-target apparatus at the next delivery of the maintenance information Im.

7 Claims, 5 Drawing Sheets

(56) References Cited

U.S. PATENT DOCUMENTS

| | | | | |
|---|---|---|---|---|
| 7,502,744 | B2* | 3/2009 | Garrow | G06Q 10/06 705/1.1 |
| 10,928,004 | B2* | 2/2021 | Fujiwara | F16T 1/48 |
| 2001/0002460 | A1* | 5/2001 | Nguyen | F16T 1/48 702/35 |
| 2002/0046048 | A1 | 4/2002 | Fukushima et al. | |
| 2002/0120422 | A1* | 8/2002 | Nagase | G05B 19/0423 702/127 |
| 2004/0193467 | A1* | 9/2004 | Williams | G06Q 10/04 705/7.24 |
| 2005/0165582 | A1* | 7/2005 | Tsung | G06Q 10/06 702/184 |
| 2005/0275530 | A1* | 12/2005 | Kates | G08B 25/009 340/539.22 |
| 2006/0118647 | A1* | 6/2006 | Cheskaty | F16T 1/48 236/93 R |
| 2006/0122808 | A1* | 6/2006 | Quake | F16T 1/48 702/183 |
| 2007/0073495 | A1* | 3/2007 | Anderson | G05B 23/0232 702/50 |
| 2008/0126171 | A1 | 5/2008 | Baldwin et al. | |
| 2008/0150737 | A1* | 6/2008 | Karschnia | F22B 37/428 340/605 |
| 2010/0023307 | A1* | 1/2010 | Lee | G06K 9/6226 703/7 |
| 2010/0070237 | A1* | 3/2010 | Yitbarek | G06Q 10/06 702/177 |
| 2011/0234418 | A1* | 9/2011 | Liao | F16T 1/48 340/679 |
| 2011/0236842 | A1* | 9/2011 | Ecock | F24D 19/1009 432/1 |
| 2011/0298629 | A1* | 12/2011 | Wilson | G05B 23/0283 340/679 |
| 2014/0090712 | A1* | 4/2014 | Karschnia | F16T 1/48 137/1 |
| 2014/0261791 | A1 | 9/2014 | Grabau et al. | |
| 2014/0336791 | A1* | 11/2014 | Asenjo | G05B 13/026 700/44 |
| 2015/0269513 | A1* | 9/2015 | Kaneko | G16H 40/20 705/7.15 |
| 2018/0128424 | A1* | 5/2018 | Fujiwara | F16T 1/48 |
| 2018/0341255 | A1* | 11/2018 | Turney | G05B 23/0283 |

FOREIGN PATENT DOCUMENTS

| | | | |
|---|---|---|---|
| JP | 200223831 A | 1/2002 | |
| JP | 2003114294 A | 4/2003 | |
| JP | 2004236148 A | 8/2004 | |
| JP | 2004240642 A | 8/2004 | |
| JP | 2014164322 A | 9/2014 | |
| WO | WO-0233631 A1 * | 4/2002 | G06Q 10/06 |
| WO | WO2021042687 A1 * | 7/2020 | |

* cited by examiner

○○○, INC.  △△△FACTORY   TO WHOM IT MAY CONCERN

THE FOLLOWING ARE TODAY'S RESULTS OF TRAP OPERATION DETERMINATION.
YESTERDAY'S RESULTS ARE SHOWN IN PARENTHESES.

NUMBER OF MEASUREMENT LOCATIONS: 77(77)
    CLOGGING: 1, INCLUDING 0 CONFIRMED (0, INCLUDING 0 CONFIRMED)
    LEAKAGE: 1, INCLUDING 0 CONFIRMED (0, INCLUDING 0 CONFIRMED)
SUSPENSION: 51(51)

LOCATIONS OF CLOGGING

※※※※※※, □□□□

LOCATIONS OF LEAKAGE

※※※※※※, □□□□

LOCATIONS WHERE THERE IS POSSIBILITY OF CLOGGING
※※※※※※, □□□□
※※※※※※, □□□□
※※※※※※, □□□□
※※※※※※, □□□□
※※※※※※, □□□□
※※※※※※, □□□□
※※※※※※, □□□□
※※※※※※, □□□□
※※※※※※, □□□□

LOCATIONS WHERE PREPARATIONS FOR TRAP REPLACEMENT ARE REQUIRED
※※※※※※, □□□□
※※※※※※, □□□□

THANK YOU

Fig.4

○○○, INC.　△△△FACTORY　　TO WHOM IT MAY CONCERN

THE FOLLOWING ARE TOMORROW'S PREDICTED RESULTS OF
TRAP OPERATION DETERMINATION.
TODAY'S RESULTS ARE SHOWN IN PARENTHESES.

NUMBER OF MEASUREMENT LOCATIONS : 73(73)
　　CLOGGING: 2, INCLUDING 1 CONFIRMED (1, INCLUDING 1 CONFIRMED)
　　LEAKAGE: 2, INCLUDING 0 CONFIRMED (0, INCLUDING 0 CONFIRMED)
SUSPENSION : 49(49)

LOCATIONS OF CLOGGING

******, □□□□
******, □□□□

LOCATIONS OF LEAKAGE

******, □□□□
******, □□□□

THANK YOU

MAINTENANCE SUPPORT SYSTEM AND MAINTENANCE SUPPORT METHOD

CROSS-REFERENCE TO RELATED APPLICATIONS

This application is the United States national phase of International Application No. PCT/JP2016/054274 filed Feb. 15, 2016, and claims priority to Japanese Patent Application No. 2015-078439 filed Apr. 7, 2015, the disclosures of which are hereby incorporated in their entirety by reference.

TECHNICAL FIELD

The present invention relates to a maintenance support system and a maintenance support method for a plurality of maintenance-target apparatuses in a plant.

BACKGROUND ART

For example, a malfunctioning steam trap in a steam plant affects the production efficiency of the plant, and therefore it is necessary to regularly monitor the states of steam traps, and keep them in a normal state by performing maintenance work on a trap if a malfunction is found. Since a large number of steam traps are provided in a steam plant, it is conceivable that maintenance information that indicates the respective operational statuses of the traps, which specify which trap is out of order (statuses that specify which trap is in a bad state), is delivered to maintenance personnel on a daily basis, for example, so that maintenance work can be efficiently performed. Maintenance information enables maintenance personnel to know how many man-hours are required, how many workers are required, which replacement trap and tools are required, and so on, and thus maintenance personnel can accurately replace or repair a trap.

For the sake of accurate maintenance work, it is preferable that maintenance information is generated and delivered based on the respective operational statuses of the traps that have been obtained up to the time immediately before maintenance work is performed, and therefore maintenance information is transmitted immediately before maintenance work is performed.

If maintenance information is delivered immediately before maintenance work is performed, it is necessary to, for example, prepare the required number of workers and the required number of replacement traps of the required type for maintenance work in a hurry after the maintenance information has been delivered, or prepare a larger number of workers and traps than required to avoid a shortage, and hence it is difficult to make efficient preparations. Considering such a situation, it is conceivable to deliver maintenance information earlier to allow for a longer time for preparations. However, if this is the case, maintenance information is not generated based on the operational statuses that have been obtained up to the time immediately before maintenance work is performed, and there is the risk of the accuracy of maintenance work being impaired.

SUMMARY

There is demand for a maintenance support system and a maintenance support method that can realize accurate maintenance work as well as efficient preparations for maintenance work.

Characteristic configurations of a maintenance support system according to the present disclosure lie in that a maintenance support system for a plurality of maintenance-target apparatuses in a plant, comprising:

a maintenance information delivery unit configured to deliver maintenance information that indicates an operational status of each maintenance-target apparatus to maintenance personnel every preset time, wherein the maintenance information delivery unit is configured to deliver predictive information to the maintenance personnel at a specified time between the previous delivery of the maintenance information and the next delivery of the maintenance information, the predictive information providing predictions regarding the operational status of each maintenance-target apparatus at the next delivery of the maintenance information.

With this configuration, while maintenance information for maintenance work is delivered, predictive information that provides predictions regarding the operational statuses of the maintenance-target apparatuses is delivered to maintenance personnel, prior to the delivery of maintenance information for maintenance work. Therefore, maintenance personnel can estimate the number of man-hours, the number of workers, the number and type of replacement maintenance-target apparatuses, and tools that are required for the next maintenance work to be performed, in advance. Thus, it is possible to make efficient preparations with reduced unnecessary elements in terms of workers and apparatuses, by avoiding preparing unnecessary workers or replacement apparatuses. Therefore, it is possible to make efficient preparations for maintenance work by delivering predictive information, while ensuring accurate maintenance work by delivering maintenance information.

Further characteristic configurations of the maintenance support system according to the present disclosure lie in that the maintenance support system further includes: detectors configured to detect a state of each maintenance-target apparatus; and a determination unit configured to generate determination results based on detected detection signals, the determination results being results of determination regarding the states of the maintenance-target apparatuses, wherein the maintenance information delivery unit is configured to generate the maintenance information from the determination results that are based on the detection signals detected during the preset time, and generate the predictive information from the determination results that are based on the detection signals detected during a period from the previous delivery of the maintenance information to the specified time.

With this configuration, maintenance information is generated from the determination results that are based on the detection signals detected during the preset time, and thus maintenance information that reflects the states of the apparatuses that have been obtained up to the time immediately before the delivery is delivered to maintenance personnel. Therefore, maintenance personnel can perform accurate maintenance work. Also, predictive information is generated from determination results that are based on detection signals that have been detected up to the specified time at which the predictive information is to be delivered, and thus reliable predictive information that reflects the states of the traps that have been obtained up to the specified time is delivered to the maintenance personnel. Therefore, maintenance personnel can make more efficient preparations while reducing unnecessary elements. Therefore, it is possible to make more efficient preparations for maintenance work while ensuring accurate maintenance work.

Also, in a case where there is a difference between the predictive information and the maintenance information, if the cause of the difference is analyzed and the result of analysis is reflected in determination by the determination unit and the generation of predictive information by the maintenance information delivery unit, it is possible to improve the accuracy of predictive information.

Further characteristic configurations of the maintenance support system according to the present disclosure lie in that the detectors are configured to intermittently detect the state of each maintenance-target apparatus a plurality of times during the preset time, the determination unit is configured to generate the determination results regarding the states of the maintenance-target apparatuses respectively for the detected detection signals, the maintenance information delivery unit is configured to generate the maintenance information based on statistics regarding the determination results obtained during the preset time, and the maintenance information delivery unit is configured to generate the predictive information based on the statistics regarding the determination results obtained during a period from the previous delivery of the maintenance information to the specified time.

With this configuration, the states of the maintenance-target apparatuses are intermittently detected. Therefore, it is possible to suppress power consumed by the state detectors and reduce costs. Also, since maintenance information and predictive information are not generated based on the results of determination performed once, but on statistics regarding results of determination performed a plurality of times, sufficiently accurate maintenance information and predictive information can be generated. Therefore, it is possible to reduce operation costs while ensuring accurate maintenance work and efficient preparations therefor.

In particular, although determination results regarding steam traps are likely to change frequently, it is possible to prevent misdetection from occurring by determining the states of the steam traps based on statistics regarding determination results obtained a plurality of times, instead of determination results obtained once, to create the operational statuses.

Further characteristic configurations of the maintenance support system according to the present disclosure lie in that the determination unit is configured to generate the determination results that include remaining battery charge of the detectors, and the maintenance information delivery unit is configured to generate the maintenance information and the predictive information that include remaining battery charge of the detectors at the present time and predicted remaining battery charge of the detectors in the future.

That is, if the remaining battery charge of a detector is low, the detection signals for the detector may cause misdetection. e.g. indicate an abnormal value. However, with this configuration, maintenance information and predictive information that include the remaining battery charge of the detectors at the present time and the predicted remaining battery charge of the detectors in the future are generated. Therefore, it is possible to know in advance the remaining battery charge and when the batteries should be replaced. With this configuration, it is possible to prevent the detectors from performing misdetection due to low remaining battery charge.

Further characteristic configurations of the maintenance support system according to the present disclosure lie in that the time required for maintenance work on the plant has been set as a preset maintenance work time, and the determination unit configured to generate the determination results based on the detection signals that are detected after the preset maintenance work time has elapsed.

That is, detection signals that are detected prior to the preset maintenance work time that has been set as the time required for maintenance work may be those obtained before repairs are performed, despite repairs being necessary in maintenance work, and may be inappropriate for the generation of maintenance information and predictive information. However, with this configuration, the determination results are generated based on detection signals obtained after the preset maintenance work time has elapsed, and therefore both the maintenance information and the predictive information are generated based on the determination results that are based on detection signals obtained after the preset maintenance work time has elapsed. This makes it possible to obtain maintenance information and predictive information for the maintenance-target apparatuses after maintenance work has been performed.

Characteristic configurations of a maintenance support method according to the present disclosure lie in that, a maintenance support method for a plurality of maintenance-target apparatuses in a plant includes:

a maintenance information delivery step of delivering maintenance information that indicates an operational status of each maintenance-target apparatus to maintenance personnel every preset time, and a predictive information delivery step of delivering predictive information to the maintenance personnel at a specified time between the previous maintenance information delivery step and the next maintenance information delivery step, the predictive information providing predictions regarding the operational status of each maintenance-target apparatus at the next maintenance information delivery step.

EMBODIMENTS

The following describes a maintenance support system and a maintenance support method according to the present disclosure with reference to the drawings. The maintenance support system according to the present embodiment relates to maintenance support for a plurality of maintenance-target apparatuses 1 in a plant. The maintenance support system includes a maintenance information delivery unit 7 configured to deliver maintenance information Im that indicates the operational status of each maintenance-target apparatus 1 to maintenance personnel every preset time T. The maintenance information delivery unit 7 is configured to deliver predictive information If to maintenance personnel at a specified time between the previous delivery of maintenance information Im and the next delivery of maintenance information Im. The predictive information If provides predictions regarding the operational status of each maintenance-target apparatus 1 at the next delivery of maintenance information Im. Thus, it is possible to perform accurate maintenance work, and it is also possible to efficiently prepare for maintenance work. The following describes the details of the maintenance support system according to the present embodiment.

Figure 1:
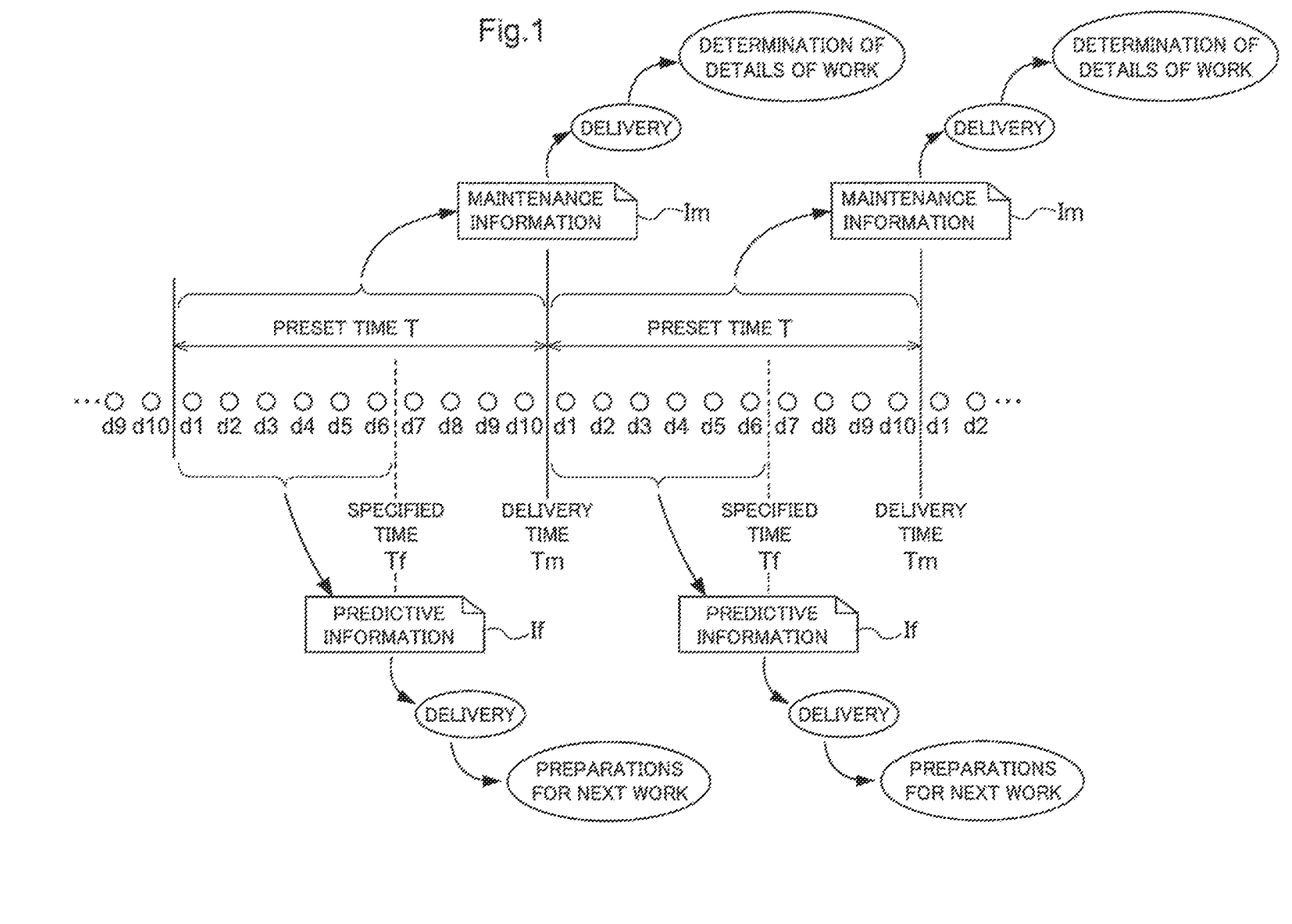
FIG. 1 is a diagram illustrating an overview of a maintenance support system according to the present disclosure.

First, an overview of the maintenance support system (and the maintenance support method) will be described based on the example shown in FIG. 1. This maintenance support system relates to maintenance of a plurality of maintenance-target apparatuses in a plant, and essentially the maintenance support system regularly delivers maintenance information Im that indicates the respective operational statuses of the maintenance-target apparatuses (statuses that specify which apparatus is in a bad state, for example) such that maintenance information Im can be used in maintenance work that is regularly performed on the maintenance-target apparatuses, and thus supports the maintenance work.

This maintenance support system is configured to deliver maintenance information Im every preset time T. Each maintenance-target apparatus is provided with a detector that detects the state of the maintenance-target apparatus corresponding thereto, and the detector intermittently detects the state of the maintenance-target apparatus. Note that the state detection is performed a plurality of times during the preset time T (for example, ten times in FIG. 1). Then, based on the detection signals, determination results dn, which are the results of determination regarding the state of a maintenance-target apparatus (for example, d1 to d10 in FIG. 1), are respectively generated for the detection signals. That is, the same number of determination results as the number of times the detection is performed by a detector (for example, ten determination results in FIG. 1) are generated during each preset time T.

In the maintenance support system, upon the preset time T elapsing and a delivery time Tm of maintenance information Im being reached, maintenance information Im that indicates the respective operational statuses of the maintenance-target apparatuses is generated based on statistics regarding the determination results generated during the preset time T (for example, ten determination results in FIG. 1), and is delivered to maintenance personnel. Maintenance personnel confirm the details of maintenance work to be performed, based on this maintenance information.

Furthermore, the maintenance support system is configured to deliver predictive information If to maintenance personnel at a specified time Tf between the previous delivery of maintenance information and the next delivery of maintenance information. The predictive information If provides predictions regarding the operational status of each maintenance-target apparatus at the next delivery of maintenance information.

Specifically, upon the specified time Tf being reached, predictive information If that indicates the state of each maintenance-target apparatus is generated based on statistics regarding the determination results generated during the period from the previous delivery of maintenance information to the specified time Tf (e.g. six determination results in FIG. 1), and is delivered to maintenance personnel. Maintenance personnel can prepare for the next maintenance work to be performed, based on this predictive information If.

As described above, in this maintenance support system, the details of maintenance work to be performed are confirmed based on maintenance information Im in which the previous determination results are also taken into consideration, and thus accurate maintenance work is performed. Also, it is possible to efficiently prepare for maintenance work that requires a certain amount of time for the allotment of workers and the preparation of replacement parts, based on the predictive information If that is delivered prior to the maintenance information Im, while reducing unnecessary elements in terms of workers and replacement parts.

The following describes an example of a maintenance support system for a steam plant, in which the maintenance-target apparatuses are a large number of steam traps that are installed in sections of the steam plant, and maintenance work is performed on defective steam traps on a daily basis.

Figure 2:
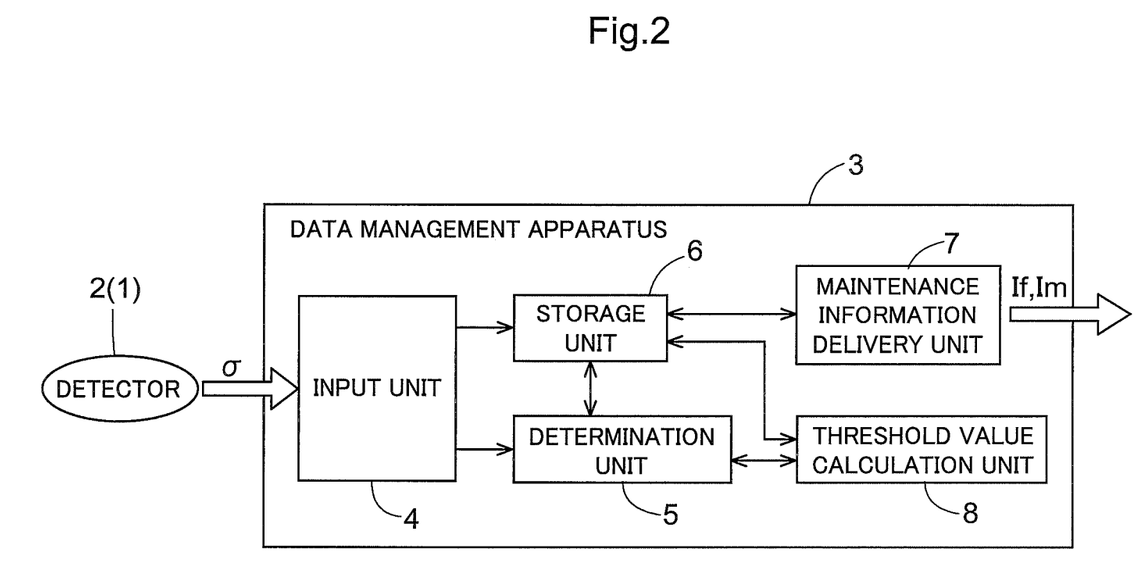
FIG. 2 is a block diagram for the maintenance support system according to the present disclosure.

As shown in FIG. 2, the maintenance support system includes: detectors 2 that are respectively installed on steam traps 1, which are the maintenance-target apparatuses, to detect the state (temperature and ultrasonic waves) of each steam trap 1; and a data management apparatus 3 configured to deliver maintenance information, which indicates the respective operational statuses of the maintenance-target apparatuses, to maintenance personnel every preset time (every day in the present embodiment) based on detection signals from the detectors 2.

The detectors 2 are each configured to intermittently detect the state of a steam trap 1 a plurality of times during the preset time (one day). For example, in the present embodiment, the detectors 2 are set to detect the state of a steam trap 1 once every hour. Each time detection is performed, the detectors 2 transmit a detection signal to the data management apparatus 3 using a communication means (not shown). In this way, the detectors 2 intermittently detect the state of a steam trap 1, and thus power consumption is suppressed and costs are reduced. Note that each detector 2 is configured to transmit identification information regarding the steam trap 1 on which the detector 2 is installed, to the data management apparatus 3, as well as a detection signal. It is not essential that the detectors 2 detect the temperature and ultrasonic waves of a steam trap, and the detectors 2 need only detect one or more physical amounts regarding a steam trap 1.

The data management apparatus 3 includes: an input unit 4 to which detection signals from the detectors 2 are input; a determination unit 5 configured to generate determination results, which are the results of determination regarding the state of each steam trap 1, based on the input detection signals; a storage unit 6 configured to cumulatively store therein the determination results generated by the determination unit 5; a maintenance information delivery unit 7 configured to generate maintenance information based on the determination results that have been cumulatively stored in the storage unit 6, and deliver the maintenance information to maintenance personnel every preset time; and a threshold value calculation unit 8 configured to calculate a normal range (described later), using a predetermined calculation reference.

The determination unit 5 determines the state of each steam trap 1 based on the input detection signals. More specifically, the determination unit 5 determines whether a steam trap 1 is in a normal state, a bad state, or a state indicating an inclination toward a bad state (i.e. a state that is not a bad state, but is highly likely to change to a bad state) from a state value (the temperature and ultrasonic waves of the steam trap 1 in the present embodiment) that is based on a detection signal. Upon determining that a steam trap 1 is in a bad state, the determination unit 5 also determines, for example, whether or not a steam apparatus that relates to the steam trap is operating, to determine whether the steam trap 1 itself is in a bad state, or the steam trap 1 is not in a bad state, but in a suspended state (a suspended state or the like due to causes other than a malfunction). The determination unit 5 performs determination to generate a determination result regarding the state of each steam trap 1, for each input detection signal.

Here, the state value is a concept that includes not only a value that indicates a given physical amount (e.g. temperature, ultrasonic waves, or pressure) detected by a detector 2, but also a value that indicates a combination of a plurality of detected physical amounts (e.g. a value obtained by totaling a plurality of weighted physical amounts). Also, it is not essential that only one state value is subjected to determination, and determination may be performed on a plurality of state values, or on a combination of the value and the inclination of a state value.

The determination results obtained by the determination unit 5 are stored in the storage unit 6 in association with the identification information regarding the steam trap 1 corresponding thereto. Each time a detection signal regarding a steam trap 1 is newly input from a detector 2, the storage unit 6 cumulatively stores a determination result that is based on the detection signal. As a result, the determination results regarding all of the maintenance-target steam traps 1 are cumulatively stored in the storage unit 6 in chronological order.

The maintenance information delivery unit 7 delivers maintenance information that indicates the respective operational statuses of the steam trap 1 to maintenance personnel every preset time, as described above. The maintenance information is generated from determination results that are based on detection signals detected during a preset time, and more specifically, the maintenance information is generated based on statistics regarding determination results obtained during a preset time. Maintenance information thus generated is delivered to maintenance personnel.

The following specifically describes the generation of maintenance information. First, in the present embodiment, the preset time is set to one day (twenty-four hours), and maintenance information is set to be generated and delivered to maintenance personnel at 8:00 AM every day. In this case, the maintenance information delivery unit 7 generates maintenance information at 8:00 AM every day.

The maintenance information delivery unit 7 generates maintenance information based on the determination results that have been cumulatively stored in the storage unit 6. More specifically, first, for each steam trap 1, the maintenance information delivery unit 7 extracts determination results corresponding to twenty four points in time, regarding the detection signals detected by a detector 2 during a period from the previous delivery of maintenance information to the present time (e.g. during twenty-four hours). Then, the maintenance information delivery unit 7 determines that the steam trap 1 is in a state that is most frequently indicated by the determination results corresponding to twenty-four points in time, out of the four states, namely a normal state, a bad state, a state indicating an inclination toward a bad state, and a suspended state or the like. The same determination is performed on each steam trap 1, and the states of all of the maintenance-target steam traps 1 are determined.

Figure 3:
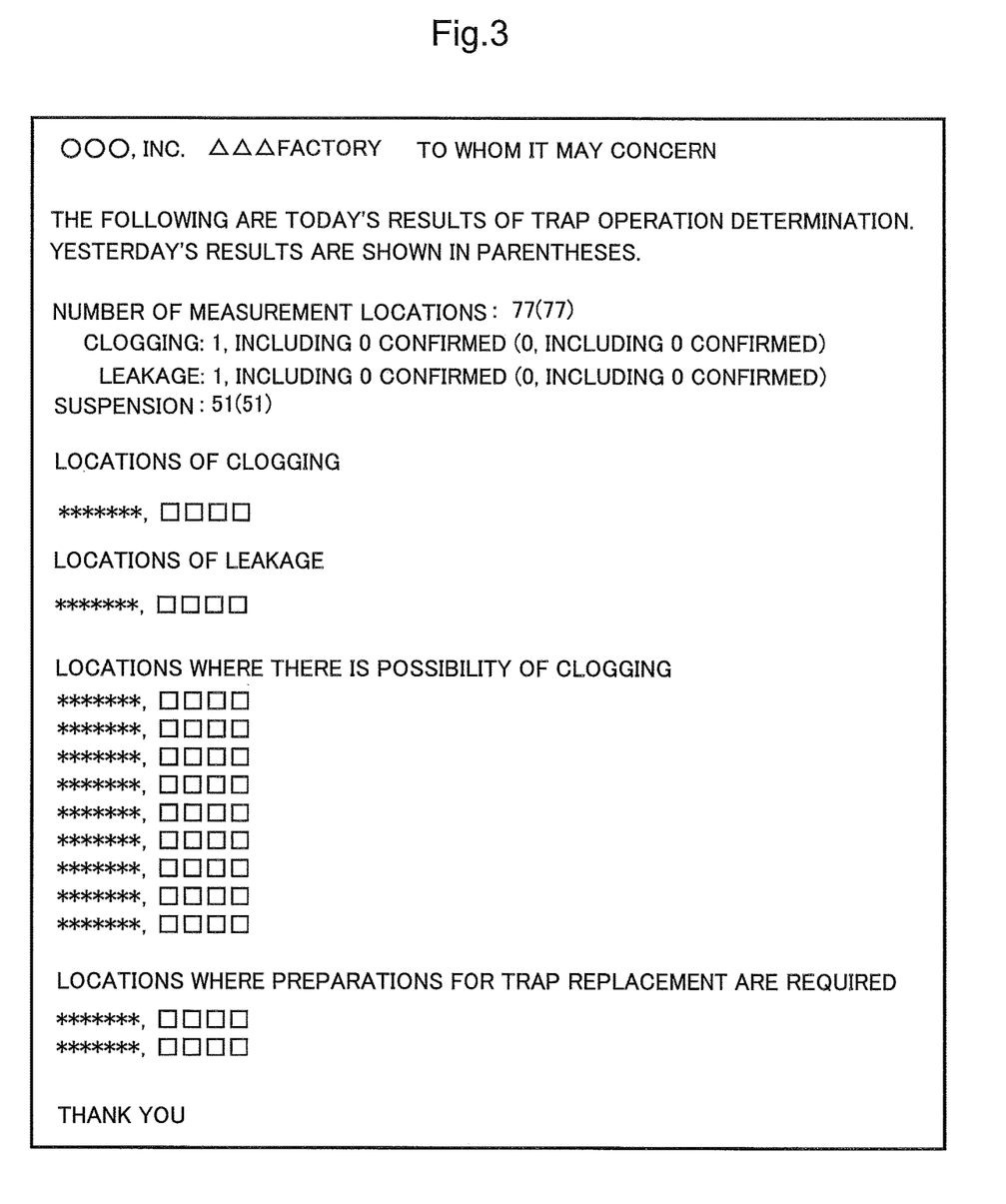
FIG. 3 is a diagram showing an example of maintenance information.

Then, the maintenance information delivery unit 7 generates maintenance information as shown in FIG. 3 based on the states of all of the steam traps 1. The maintenance information includes: a summary field, which shows the number of maintenance targets, and a breakdown indicating the number of locations in a bad state and the number of locations in a suspended state; and a detail field, which shows, for example, the details of locations in a bad state and the details of locations where the state indicates an inclination toward a bad state. In the summary field, values in the previous maintenance information are shown in parentheses so that comparisons can be made with those from the previous day. The determination results are based on the detection signals from the detectors 2, and are not results that are visually confirmed. Therefore, whether or not the determination results have been visually confirmed is also shown. The detail field shows the product type and positional information of a steam trap 1 regarding each of the locations in a bad state and each of the locations where the state indicates an inclination toward a bad state, and locations where preparations for trap replacement are required, as the details of maintenance work that is to be performed. Note that the detail field may show not only the locations where preparations for trap replacement are required, but also various kinds of maintenance work such as cleaning of the steam trap 1, replacement of the detector 2, replacement of the battery of the detector 2, and recovery of communication between the detector 2 and the data management apparatus 3. In this way, maintenance information includes the number of steam traps 1 in a bad state (and a state indicating an inclination toward a bad state, and a suspended state) out of maintenance-target steam traps 1, the product type and positional information of the steam traps 1 in a bad state (and a state indicating an inclination toward a bad state), and the details of maintenance work that is to be performed on the maintenance-target steam traps 1.

The created maintenance information is delivered to terminals such as personal computers of maintenance personnel via e-mail. Based on this maintenance information, maintenance personnel replaces a steam trap 1 that has been determined as being in a bad state, and repair a steam trap 1 that has been determined as being in a state indicating an inclination toward a bad state, if possible.

In this maintenance support system, the maintenance information delivery unit 7 is configured to deliver, in addition to maintenance information, predictive information that provides predictions regarding the operational status of each maintenance-target apparatus at the next delivery of maintenance information, to maintenance personnel. This predictive information is delivered at a specified time between the previous delivery of maintenance information and the next delivery of maintenance information. This predictive information is generated from determination results that are based on detection signals detected between the previous delivery of maintenance information and the specified time, and more specifically, the predictive information is generated based on statistics regarding determination results obtained between the previous delivery of maintenance information and the specified time.

The following specifically describes the delivery of predictive information. First, in the present embodiment, maintenance information is set to be generated and delivered to maintenance personnel at 8:00 AM every day, but 16:00 PM is set to the specified time at which predictive information is delivered. In this case, the maintenance information delivery unit 7 generates predictive information at 16:00 PM every day.

Basically, predictive information is generated in the same manner as the maintenance information. That is, maintenance information is generated based on the determination results that have been cumulatively stored in the storage unit 6. More specifically, for the steam traps 1, the maintenance information delivery unit 7 extracts determination results corresponding to eight points in time, regarding the detection signals detected by the detectors 2 during a period from the previous delivery of maintenance information to the present time (16:00 PM) (i.e. during eight hours). Then, the maintenance information delivery unit 7 predicts that the state of the steam trap 1 will be the state that is most frequently indicated by the determination results, out of the four states, namely a normal state, a bad state, a state indicating an inclination toward a bad state, and a suspended state or the like. The same is performed on each steam trap 1, and predictions regarding the states of all of the maintenance-target steam traps 1 are provided.

Figure 4:
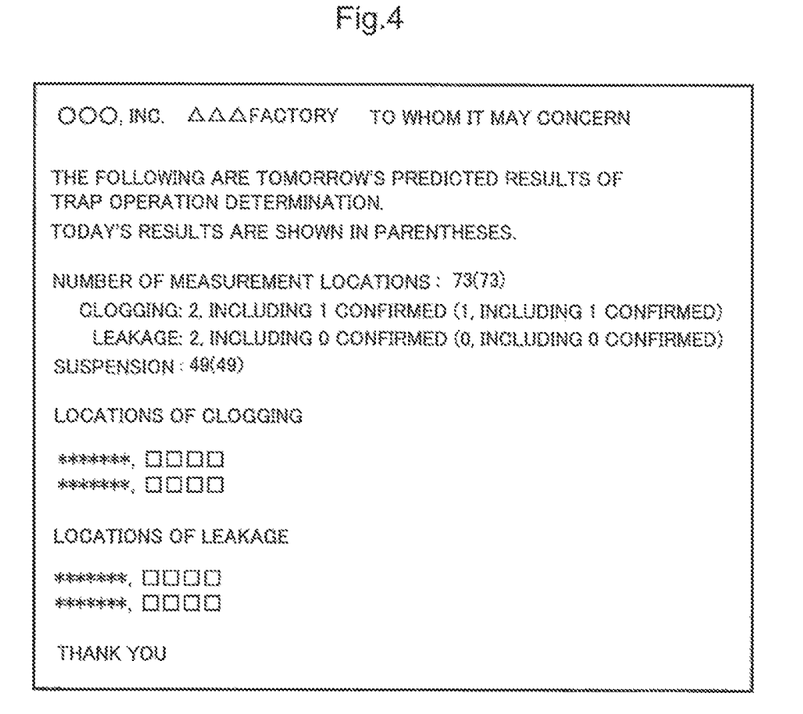
FIG. 4 is a diagram showing an example of predictive information.

Then, based on the states of all of the steam traps 1, predictive information If is created as shown in FIG. 4, where the predictive information If includes: a summary field, which shows the number of maintenance targets, and a breakdown indicating the number of locations in a bad state and the number of locations in a suspended state; and a detail field, which shows the details of the locations in a bad state (the detail field may also show the details of the locations where the state indicates an inclination toward a bad state). In the summary field, values in the previous maintenance information are shown in parentheses so that comparisons can be made with those from the previous day. The determination results are based on the detection signals from the detectors 2, and are not results that are visually confirmed. Therefore, whether or not the determination results have been visually confirmed is also shown. The detail field shows the product type and positional information of each of the steam traps 1 at the locations in a bad state. Note that predictive information may also include maintenance work that is to be performed on maintenance-target steam traps 1 as with maintenance information.

The created predictive information is delivered to terminals such as personal computers of maintenance personnel via e-mail. Then, based on this predictive information, maintenance personnel estimate the number of man-hours, the number of workers, the number and type of replacement traps, and tools that are required for the next maintenance work to be performed, and prepare for the maintenance work.

As a result, while maintenance information for maintenance work is delivered, predictive information that provides predictions regarding the operational statuses of the maintenance-target apparatuses is delivered to maintenance personnel, prior to the delivery of maintenance information for maintenance work. Therefore, maintenance personnel can estimate the number of man-hours, the number of workers, the number and type of replacement traps, and tools that are required for the next maintenance work to be performed, in advance. Thus, it is possible to make efficient preparations with reduced unnecessary elements in terms of workers and traps, by avoiding having unnecessary workers or preparing unnecessary replacement traps. Therefore, it is possible to make efficient preparations for maintenance work by delivering predictive information, while ensuring accurate maintenance work by delivering maintenance information.

Next, the above-described determination performed by the determination unit 5 will be more specifically described. As described above, the determination unit 5 determines whether the state of each steam trap 1 is a normal state, a bad state, or a state indicating an inclination toward a bad state (or a suspended state or the like, which is omitted here), based on the temperature and ultrasonic waves of the steam trap 1. More specifically, threshold values are respectively provided for the temperature and the ultrasonic waves, and the determination unit 5 determines whether the state is a normal state, a state indicating an inclination toward a bad state, or a bad state, based on the threshold values. The following describes a threshold value setting system according to the present embodiment and a threshold value setting method employed therein.

Threshold Value Setting Method

Generally, to determine the state of a steam trap 1, an upper limit value, a lower limit value, or both are set as a state value (a value indicating the state of a steam trap 1 such as a physical amount such as the temperature or ultrasonic waves or the like) of the determination target, regardless of the purpose of the steam trap 1 (e.g. the type of apparatus or facility where the trap 1 is installed in relation thereto, and the pressure and temperature of steam employed in a plant), and the state is determined as being a bad state if a determination-target state value is higher than the upper limit value or lower than the lower limit value. Here, the upper limit value and the lower limit value are referred to as an acceptable upper limit value tu and an acceptable lower limit value tl, and a range above the acceptable upper limit value tu and a range below the acceptable lower limit value tl are referred to as bad ranges.

Note that determination-target state values are not constant and vary over time even if a steam trap 1 is in a normal state. The range of values that can be taken when a steam trap 1 is in a normal state is referred to as a normal range. The upper limit value and the lower limit value of the normal range (referred to as a normal upper limit value nu and a normal lower limit value nl) are different from the acceptable upper limit value tu and the acceptable lower limit value tl, and exist between the acceptable upper limit value tu and the acceptable lower limit value tl. There are no problems when the determination-target state value falls within the normal range. However, it can be said that, when the determination-target state value is out of the normal range, even if the determination-target state value is not in a bad range, the state of the steam trap 1 is highly likely to change to a bad state.

Figure 5:
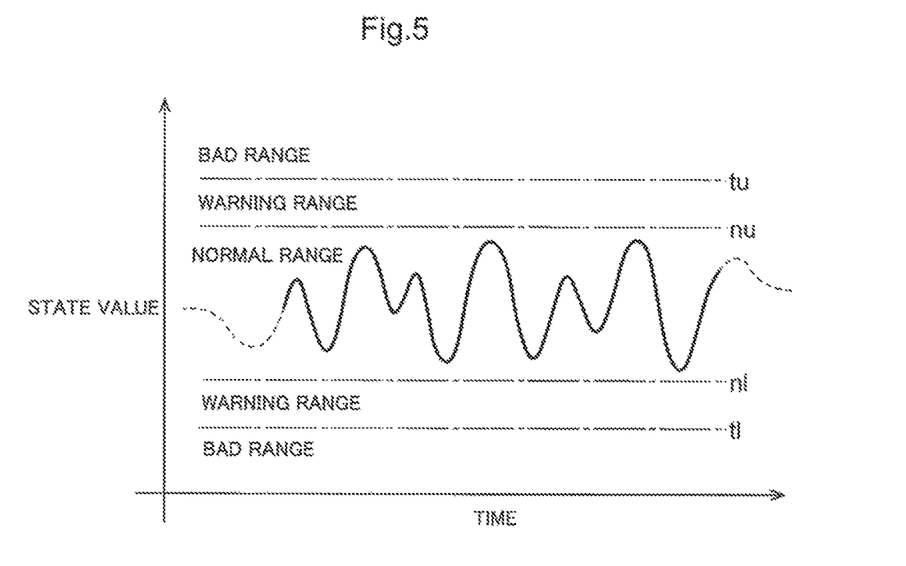
FIG. 5 is a diagram showing an example of a temporal change in the state of a steam trap.

That is, if warning ranges are defined between the normal range and bad ranges (e.g. the range between the acceptable upper limit value tu and the normal upper limit value nu and the range between the normal lower limit value nl and the acceptable lower limit value tl in FIG. 5), there are warning ranges of the determination-target state value in addition to the normal range corresponding to cases where the steam trap 1 is in a normal state, and the bad ranges corresponding to cases in which the steam trap 1 is determined as being in a bad state. It can be said that, if the determination-target state value is in a warning range, the state value is highly likely to enter a bad range, i.e. the steam trap 1 is highly likely to enter a bad state.

Based on such an idea, the determination unit 5 sets the acceptable upper limit value tu, the acceptable lower limit value tl, the normal upper limit value nu, and the normal lower limit value nl for each of the temperature and ultrasonic wave values, and determines that the steam trap 1 is in a normal state if the temperature and ultrasonic wave values fall within a normal range, determines that the steam trap 1 is in a state indicating an inclination toward a bad state if the temperature and ultrasonic wave values fall within a warning range, and determines that the steam trap 1 is in a bad state if the temperature and ultrasonic wave values fall within a bad range.

However, as described above, there is a problem in which the normal upper limit value nu and the normal lower limit value nl change according to the purpose of a steam trap 1, while the acceptable upper limit value tu and the acceptable lower limit value tl are constant regardless of the purpose of a steam trap 1. Therefore, it is necessary to set the normal upper limit value nu and the normal lower limit value nl, i.e. the normal range, for each target steam trap 1.

Considering such a problem, the maintenance support system according to the present embodiment includes the following configuration that serves as a threshold value calculation system for setting a normal range. That is, the determination unit 5 is configured to perform bad state determination based on detection signals from a detector 2 to determine whether a steam trap 1 is in a normal state or a bad state. Here, the bad state determination is performed based on whether or not state values that are based on detection signals from a detector 2 are in a bad range of the state values (whether or not the state values have exceeded the acceptable upper limit value tu, or whether or not the state values have fallen below the acceptable lower limit value tl). The storage unit 6 is configured to cumulatively store the determination-target state value and the determination result regarding the bad state determination. Then, the threshold value calculation unit 8 is configured to calculate a normal range (i.e. the normal upper limit value nu and the normal lower limit value nl) using a predetermined calculation reference, based at least on state values with normal determination results from among state values stored in the storage unit 6 during a predetermined period.

That is, in the maintenance support system, in order to calculate a normal range, the determination unit 5 is caused to perform bad state determination based on detection signals obtained by the detectors 2, and the storage unit 6 cumulatively stores determination-target state values and determination results of the bad state determination. Thus, the determination-target state values of each steam trap 1 and the determination results of the bad state determination regarding the state values have been cumulatively stored in the storage unit 6 since a point in time in the past. Then, the threshold value calculation unit 8 calculates the normal upper limit value nu and/or the normal lower limit value nl of a normal range using a predetermined calculation reference, based on detection values with normal results regarding bad state determination, from among the detection values that have been cumulatively stored during a predetermined period. For example, a normal range is calculated using an average value μ and a standard deviation σ of state values stored during a predetermined period, a coefficient r, which is a positive integer number, is set as the calculation reference, and μ±r·σ is calculated as the normal upper limit value nu and/or the normal lower limit value nl of the normal range.

This maintenance support system is configured such that the accuracy of determination (predictive determination) using the normal range calculated by the threshold value calculation unit 8 is then determined, and if the accuracy is not sufficient, the above-described calculation reference is adjusted and an appropriate normal range is set again.

Specifically, in the maintenance support system, the determination unit 5 is configured to perform predictive determination to determine whether a steam trap 1 is in a normal state or a state indicating an inclination toward a bad state, based on whether or not the state value is in a normal range, and the determination unit 5 performs predictive determination on the state values stored in the storage unit 6, including detection values not used for normal range calculation. Then, the threshold value calculation unit 8 performs accuracy determination to determine the accuracy of predictive determination based on the results of predictive determination, and adjusts the above-described calculation reference based on the result of accuracy determination.

Specifically, accuracy determination is performed by comparing the results of the predictive determination regarding the state values, with the results of bad state determination regarding state values that have been obtained during a predetermined period after the state values on which the predictive determination has been performed were detected, to determine whether the predictive determination is correct or incorrect. Whether predictive determination is correct or incorrect is determined as shown in Table 1 below.

TABLE 1

|  | Predictive Determination = Normal | Predictive Determination = Bad |
|---|---|---|
| Subsequent Bad State Determination = Normal | Correct (Case A) | Incorrect (Case C) |
| Subsequent Bad State Determination = Bad | Incorrect (Case B) | Correct (Case D) |

That is, as shown in Table 1, when a predictive determination result is normal, if bad state determination results obtained during a predetermined period thereafter remain normal (Case A), it is determined that the predictive determination is correct, and if bad state determination results obtained during a predetermined period thereafter show a change to a bad state (Case B), it is determined that the predictive determination is incorrect. Also, when a predictive determination result is a state indicating an inclination toward a bad state, if bad state determination results obtained during a predetermined period thereafter remain normal (Case C), it is determined that the predictive determination is incorrect, and if bad state determination results obtained during a predetermined period thereafter show a change to a bad state (Case D), it is determined that the predictive determination is correct.

Then, the threshold value calculation unit 8 summarizes all of the correctness determination results of the above-described predictive determination regarding the state values stored in the storage unit 6, calculates the ratio of cases in which the result of predictive determination was incorrect relative to the results of summarization, and determines whether or not the accuracy is sufficient by determining whether the ratio is higher than or lower than a predetermined value. Upon determining that the accuracy is sufficient (the ratio is lower than the predetermined value), the threshold value calculation unit 8 confirms the calculated normal upper limit value nu and/or normal lower limit value nl as the threshold value(s) for the predictive determination performed by the determination unit 5. In contrast, upon determining that the accuracy is not sufficient (the ratio is higher than the predetermined value), the threshold value calculation unit 8 adjusts the coefficient r to calculate a new normal range (the normal upper limit value nu and the normal lower limit value nl), and performs accuracy determination again using the new normal range, and repeatedly adjusts the coefficient r until it is determined that the accuracy is sufficient.

Here, as described above, cases of incorrect predictive determination are composed of cases in which a bad state could not be predicted (Case B) and cases in which a state indicating an inclination toward a bad state was determined, leading to unnecessary countermeasures (Case C). It is desirable that the coefficient r is adjusted such that both the frequency of Case B and the frequency of Case C are the smallest. However, if the coefficient r is adjusted such that the frequency of Case B is reduced, although the frequency of cases in which a bad state could not be predicted is reduced, it is more likely that a steam trap in a normal state is determined as being in a state indicating an inclination toward a bad state, and the frequency of Case C increases. In contrast, if the coefficient r is adjusted such that the frequency of Case C is reduced, although the frequency of cases in which a steam trap in a normal state is determined as being in a state indicating an inclination toward a bad state is reduced, it is more likely that a bad state will be predicted, and the frequency of Case B increases. In this way, it is impossible to reduce both the frequency of Case B and the frequency of Case C to be the smallest, and the coefficient r needs to be adjusted from a viewpoint regarding which out of Case B and Case C should be given greater importance, for example.

Therefore, the threshold value calculation unit 8 is configured to perform accuracy determination based on: a first index $\alpha$ that indicates the ratio, relative to all of the results of correctness determination regarding predictive determination, of cases in which the result of predictive determination indicates a normal state, and the results of bad state determination regarding state values obtained during the predetermined period thereafter include a result determined as indicating a bad state (Case B); a second index $\beta$ that indicates the ratio, relative to all of the results of correctness determination regarding predictive determination, of cases in which the result of predictive determination indicates a state indicating an inclination toward a bad state, and the results of bad state determination regarding state values obtained during the predetermined period thereafter do not include a result determined as indicating a bad state (Case C); or a third index $\gamma$ (e.g. $\alpha+\beta$) that is a combination of the first index $\alpha$ and the second index $\beta$.

The first index $\alpha$ indicates the ratio of cases in which a bad state could not be predicted, and the second index $\beta$ indicates the ratio of cases in which a steam trap that will be in a normal state was determined to be in a state indicating an inclination toward a bad state and unnecessary countermeasures will be performed. The third index $\gamma$ indicates the ratio of all of the incorrect cases of predictive determination. That is, accuracy determination is performed to (1) reduce cases in which a bad state could not be predicted (based on the first index $\alpha$), (2) reduce cases in which unnecessary countermeasures will be performed (based on the second index $\beta$), or (3) reduce the number of cases of incorrect predictive determination (based on the third index $\gamma$).

Furthermore, this maintenance support system is configured such that an instruction that indicates the purpose of accuracy determination, out of (1) to (3) above, is input to the input unit (corresponding to the instruction input unit) 3 for each steam trap 1, and the threshold value calculation unit 8 switches between the first index $\alpha$, the second index $\beta$, and the third index $\gamma$, based on which the accuracy determination is performed on each steam trap 1, based on the instruction from the input unit 3.

If accuracy determination is performed for the purpose (1) above (to reduce cases in which a bad state could not be predicted), the threshold value calculation unit 8 only focuses on the first index $\alpha$ in accuracy determination, and adjusts the coefficient r until it is determined that the accuracy is sufficient, where the threshold value calculation unit 8 is configured to determine that the accuracy is sufficient when the first index $\alpha$ is smaller than or equal to a given value. If accuracy determination is performed for the purpose (2) above (to reduce cases in which unnecessary countermeasures will be performed), the threshold value calculation unit 8 only focuses on the second index $\beta$ in accuracy determination, and adjusts the coefficient r until it is determined that the accuracy is sufficient, where the threshold value calculation unit 8 is configured to determine that the accuracy is sufficient when the second index $\beta$ is smaller than or equal to a given value. If accuracy determination is performed for the purpose (3) above (to reduce the number of cases of incorrect predictive determination), the threshold value calculation unit 8 only focuses on the third index $\gamma$ in accuracy determination, and adjusts the coefficient r until it is determined that the accuracy is sufficient, where the threshold value calculation unit 8 is configured to determine that the accuracy is sufficient when the third index $\gamma$ is smaller than or equal to a given value.

Note that the third index $\gamma$ may be obtained not only by simply totaling the first index $\alpha$ and the second index $\beta$, but also by totaling the first index $\alpha$ and the second index $\beta$ after assigning a weight to either one of them, and it is possible to determine the accuracy based on the sum. If this is the case, it is possible to perform flexible accuracy determination from a viewpoint regarding whether to reduce cases in which a bad state could not be predicted or to reduce cases in which unnecessary countermeasures will be performed, while considering the number of cases of incorrect predictive determination.

Figure 6:
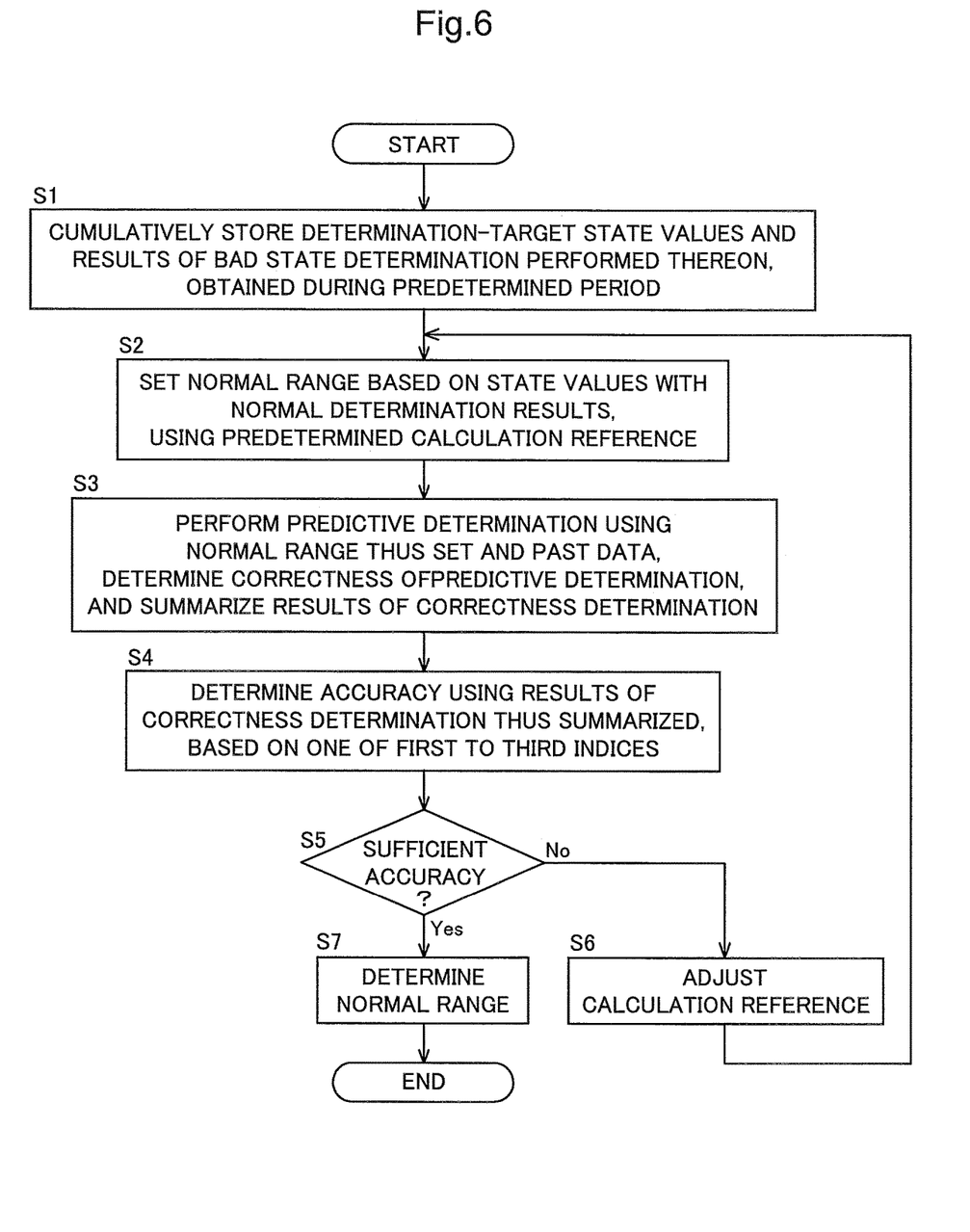
FIG. 6 is a flowchart showing an example of a procedure for determining a normal range.

The normal range is specifically set as shown in FIG. 6, for example. Here, it is assumed that the storage unit 6 cumulatively stores past data regarding each steam trap 1, i.e. the state values of the steam traps 1 detected by the detectors 2 during past operation of the plant, and the results of bad state determination performed thereon.

First, for each steam trap 1, the detection signals from the detector 2 are collected during a predetermined period, and the determination-target state values and the results of bad state determination performed thereon are cumulatively stored in the storage unit 6 (step S1). Upon the predetermined time elapsing, the threshold value calculation unit 8 sets a normal range based on state values with normal determination results, from among the state values that have been cumulatively stored (step S2).

Then, based on the normal range thus set, the determination unit 5 performs predictive determination on the state values of the steam traps 1, detected by the detectors 2 during past operation of the plant, and the threshold value calculation unit 8 determines whether the predictive determination is correct or incorrect by comparing the results of predictive determination with the results of bad state determination regarding state values that have been obtained during a predetermined period after the state values on which the predictive determination has been performed were detected (step S3). The threshold value calculation unit 8 summarizes the correctness determination results regarding the predictive determination, and performs accuracy determination based on one of the purposes shown in (1) to (3) above (i.e. one of the first to third indices $\alpha$ to $\gamma$) that has been set to the steam traps 1 (step S4).

If it is determined in this accuracy determination that the accuracy is not sufficient (step S5: No), the calculation reference (the coefficient r) for setting the normal range is adjusted (step S6), step S2 is performed again to set the normal range again, and steps S3 and S4 are repeated. If it is determined in this accuracy determination that the accuracy is sufficient (step S5: Yes), the normal range (the normal upper limit value nu and the normal lower limit value nl) thus set determines the threshold values for predictive determination (step S7).

In this way, the normal range is set (calculated) once, then accuracy determination for determining the accuracy of predictive determination that is based on this normal range is performed, and the calculation reference is adjusted based on the accuracy determination. Therefore, it is possible to adjust the calculation reference (coefficient r) for a steam trap 1 for which the accuracy of predictive determination is insufficient so that the accuracy becomes sufficient. Also, it is possible to switch between the first index, the second index, and the third index, based on which the accuracy determination is performed. Therefore, it is possible to switch the reference for accuracy determination according to the importance or purpose of the steam trap, and flexibly set the normal range according to a maintenance policy regarding steam traps. Thus, it is possible to appropriately set the normal range, and it is possible to perform accurate predictive determination on each steam trap 1.

As described above, in the maintenance support system according to the present embodiment, the normal upper limit value nu and the normal lower limit value nl are calculated and are determined as threshold values as described above, and the determination unit 5 determines the state of a steam trap 1 from among a normal state, a state indicating an inclination toward a bad state, and a bad state, using the normal upper limit value nu, the normal lower limit value nl, the acceptable upper limit value tu, and the acceptable lower limit value tl as threshold values (i.e. performs bad state determination and predictive determination). Then, based on the results of determination performed by the determination unit 5, the above-described maintenance information Im and predictive information If are generated and delivered, to support maintenance work to be performed on the steam trap 1.

Other Embodiments

Finally, other embodiments of the maintenance support system and the maintenance support method according to the present embodiment will be described. Note that the configurations disclosed in each of the embodiments below can be combined with configurations disclosed in another embodiment as long as no contradictions occur.

(i) In the embodiment above, an example of a configuration for a steam plant in which the maintenance-target apparatuses are the steam traps 1 has been described. However, embodiments of the present disclosure are not limited in such a manner, and any apparatuses in any kind of plant may be treated as the maintenance-target apparatuses without departing from the spirit of the present disclosure.

(ii) The embodiment above describes an example in which it is determined or predicted that the steam trap 1 is in a state that is most frequently indicated by the determination results, out of the four states, namely a normal state, a bad state, a state indicating an inclination toward a bad state, and a suspended state or the like, as an example of the generation of the maintenance information and the predictive information based on the statistics regarding the determination results obtained during a preset time (in the case of predictive information, a period from the previous delivery of maintenance information to a specified time). However, embodiments of the present disclosure are not limited in such a manner. For example, it is possible to perform determination or prediction while assigning each state a different weight, or to determine a state indicating an inclination toward a bad state, and a bad state, based on whether a state indicating an inclination toward a bad state, and a bad state, occurred more often than a predetermined number of times.

(iii) In the above-described embodiment, the preset time is one day and maintenance information is delivered on a daily basis. However, embodiments of the present disclosure are not limited in such a manner. For example, maintenance information may be delivered every six hours or every two days, for example, and the preset time may be shorter than one day or longer than one day. Similarly, the specified time at which predictive information is delivered may be any time.

(iv) In the above-described embodiment, the detectors 2 may include remaining battery charge thereof in detection signals and transmit them to the data management apparatus, and the determination unit 5 may generate determination results including remaining battery charge of the detectors 2, and the maintenance information delivery unit 6 may generate maintenance information and predictive information that include remaining battery charge of the detectors 2 at the present time and predicted remaining battery charge of the detectors 2 in the future. With this configuration, it is possible to prevent the detectors from performing misdetection due to low battery charge.

(v) In the above-described embodiment, the time required for performing maintenance work on a plant may be set as a preset maintenance work time, and the determination unit 5 may generate determination results based on detection signals detected after the preset maintenance work time has elapsed. If this is the case, maintenance information and predictive information are also generated based on determination results that are based on detection signals detected upon the preset maintenance work time elapsing. This makes it possible to reliably obtain maintenance information and predictive information for the steam traps 1 after maintenance work has been performed.

(vi) The embodiment above describes an example in which the detectors 2 are configured to intermittently detect the state of a steam trap 1 a plurality of times during the preset time. However, embodiments of the present disclosure are not limited in such a manner. For example, the detectors 2 may be configured to continuously detect the state of a steam trap 1. If this is the case, the detectors 2 may be configured to transmit, as a detection signal, the state of a steam trap 1 that is detected at given intervals, to the data management apparatus 3 at given intervals. The determination unit 5 in the data management apparatus 3 may generate determination results regarding the operational statuses of the steam traps 1 each time a detection signal is transmitted from a detector 2. Alternatively, the determination unit 5 may store the detection signals from the detectors 2 in the storage unit 6, and generate determination results regarding the operational statuses of the steam traps 1 at given intervals, based on the detection signals that are stored at given intervals.

(vii) The embodiment above describes an example of a configuration in which the threshold value calculation unit 8 is caused to calculate both the normal upper limit value nu and the normal lower limit value nl, and to determine both of them as threshold values for the determination unit 5, and the determination unit 5 performs determination using the normal upper limit value nu, the normal lower limit value nl, the acceptable upper limit value tu, and the acceptable lower limit value tl as threshold values. However, embodiments of the present disclosure are not limited in such a manner. The threshold value calculation unit 8 may be caused to calculate only one of the normal upper limit value nu and the normal lower limit value nl, and to determine only one of them as a threshold value for the determination unit 5, and only the acceptable lower limit value tl and the normal lower limit value nl, or only the acceptable upper limit value tu and the normal upper limit value nl may be employed as threshold values.

(viii) Regarding other configurations, the embodiments disclosed in the present description are mere examples in all respects, and it should be understood that the scope of the present disclosure is not limited by the embodiments. It should be easy for a person skilled in the art to understand that it is possible to apply modifications as appropriate without departing from the spirit of the present disclosure. Therefore, as a matter of course, other embodiments that are modified without departing from the spirit of the present disclosure are included in the scope of the present disclosure.

INDUSTRIAL APPLICABILITY

The maintenance support system and the maintenance support method according to the present disclosure are applicable to maintenance of various kinds of apparatuses in various fields.

DESCRIPTION OF REFERENCE SIGNS

1: Steam Trap (Maintenance-Target Apparatus)
2: Detector
5: Determination Unit
7: Maintenance Information Delivery Unit
σ: Detection Signal
T: Preset Time
Tf Specified Time
Im: Maintenance Information
If: Predictive Information

The invention claimed is:

1. A maintenance support method for a plurality of steam traps in a steam plant, comprising:
   delivering maintenance information that indicates an operational status of each steam trap of a plurality of steam traps in a steam plant to maintenance personnel at every preset time, a plurality of detectors configured to detect detection signals corresponding to at least one of a temperature, an ultrasonic wave, and a pressure of a steam trap,
   detecting a state of each steam trap of the plurality of steam traps in the steam plant;
   generating determination results based on detected detection signals detected each preset time by the plurality of detectors, the determination results being results of determination regarding the states of the plurality of steam traps;
   delivering predictive information to the maintenance personnel at a specified time between a previous preset time and a next preset time, the predictive information providing predictions regarding the operational status of each steam trap of the plurality of steam traps at the next preset time;
   wherein delivering the maintenance information comprises generating the maintenance information from the determination results that are based on the detection signals detected during the preset time, and
   wherein delivering predictive information comprises generating the predictive information from the determination results that are based on the detection signals detected during a period from a previous delivery of the maintenance information to the specified time and a normal range, wherein the normal range comprises a normal upper limit value and a normal lower limit value; and
   setting, for each steam trap, the normal range by:
   (i) determining, for that steam trap, based on the detection signals, determination target state values during a predetermined first time period;
   (ii) determining, based on the determination target state values, bad state determination results indicating whether that steam trap is in a normal state or a bad state according to an acceptable range including an acceptable upper limit value and an acceptable lower limit value different from the normal upper limit value and the normal lower limit value, wherein that steam trap is determined to be in the normal state if a determination target state value is within the acceptable range and determined to be in the bad state if the determination target state value is outside the acceptable range;
   (iii) setting, based on a coefficient and the determination target state values having bad state determination results indicating that steam trap is in the normal state, the normal range for that steam trap;
   (iv) determining, based on whether the determination target state values are in the normal range, predictive results indicating whether that steam trap is in the normal state or a state indicating an inclination toward the bad state;
   (v) comparing the predictive results to the bad state determination results corresponding to determination target state values for a predetermined second time period after a third time period including the determination target state values from which the prediction results were determined, to determine correctness determinations indicating whether the predictive results are correct or incorrect;
   (vi) selecting, according to a purpose of that steam trap, an index for an accuracy determination from a first index α, a second index β, and a third index γ, wherein the first index α indicates a first ratio, relative to all of the correctness determinations, of cases in which the predictive result indicates the normal state, and the bad state determination results for the predetermined second time period include a result indicating the bad state, wherein the second index β indicates a second ratio, relative to all of the correctness determinations, of cases in which the predictive result indicates the state indicating the inclination toward the bad state, and the bad state determination results for the predetermined second time period do not include a result indicating the bad state, and wherein the third index γ equals a sum of the first index α and the second index β such that γ=α+β and the third index γ indicates a ratio of all cases of incorrect predictive determination;
   (vii) reducing, by performing the accuracy determination based on the first index α, cases in which a bad state could not be predicted, reducing, by performing the accuracy determination based on the second index β, cases in which unnecessary countermeasures are performed, or reducing, by performing the accuracy determination based on the third index γ, the number of cases of incorrect predictive determination;

(viii) adjusting the coefficient to reduce the selected index; and (ix) repeating steps (iii)-(viii) until the selected index satisfies a given value associated with that index.

2. A maintenance support system for monitoring a plurality of steam traps in a steam plant, comprising:

a plurality of detectors connected to a plurality of steam traps in a steam plant, the plurality of detectors configured to detect a state of the plurality of steam traps, the plurality of detectors configured to detect detection signals corresponding to at least one of a temperature, an ultrasonic wave, and a pressure of a steam trap; and one or more processors that are programmed or configured to:

deliver maintenance information that indicates an operational status of each steam trap of the plurality of steam traps to maintenance personnel every preset time;

generate determination results based on detected detection signals that are detected each preset time by the plurality of detectors, the determination results being results of determination regarding a state of the plurality of steam traps;

wherein delivering the maintenance information comprises delivering predictive information to the maintenance personnel at a specified time between a previous delivery of the maintenance information and a next delivery of the maintenance information, the predictive information providing predictions regarding the operational status of each steam trap of the plurality of steam traps at the next delivery of the maintenance information, wherein the maintenance information is generated based on the determination results that are based on the detection signals detected during each preset time, and wherein the predictive information is generated from the determination results that are based on the detection signals detected during a period from the previous delivery of the maintenance information to the specified time and a normal range, wherein the normal range comprises a normal upper limit value and a normal lower limit value; and set, for each steam trap, the normal range by:

(i) determining, for that steam trap, based on the detection signals, determination target state values during a predetermined first time period;

(ii) determining, based on the determination target state values, bad state determination results indicating whether that steam trap is in a normal state or a bad state according to an acceptable range including an acceptable upper limit value and an acceptable lower limit value different from the normal upper limit value and the normal lower limit value, wherein that steam trap is determined to be in the normal state if a determination target state value is within the acceptable range and determined to be in the bad state if the determination target state value is outside the acceptable range;

(iii) setting, based on a coefficient and the determination target state values having bad state determination results indicating that that steam trap is in the normal state, the normal range for that steam trap;

(iv) determining, based on whether the determination target state values are in the normal range, predictive results indicating whether that steam trap is in the normal state or a state indicating an inclination toward the bad state;

(v) comparing the predictive results to the bad state determination results corresponding to determination target state values for a predetermined second time period after a third time period including the determination target state values from which the prediction results were determined, to determine correctness determinations indicating whether the predictive results are correct or incorrect;

(vi) selecting, according to a purpose of that steam trap, an index for an accuracy determination from a first index $\alpha$, a second index $\beta$, and a third index $\gamma$, wherein the first index $\alpha$ indicates a first ratio, relative to all of the correctness determinations, of cases in which the predictive result indicates the normal state, and the bad state determination results for the predetermined second time period include a result indicating the bad state, wherein the second index $\beta$ indicates a second ratio, relative to all of the correctness determinations, of cases in which the predictive result indicates the state indicating the inclination toward the bad state, and the bad state determination results for the predetermined second time period do not include a result indicating the bad state, and wherein the third index $\gamma$ equals a sum of the first index $\alpha$ and the second index $\beta$ such that $\gamma=\alpha+\beta$ and the third index $\gamma$ indicates a ratio of all cases of incorrect predictive determination;

(vii) reducing, by performing the accuracy determination based on the first index $\alpha$, cases in which a bad state could not be predicted, reducing, by performing the accuracy determination based on the second index $\beta$, cases in which unnecessary countermeasures are performed, or reducing, by performing the accuracy determination based on the third index $\gamma$, the number of cases of incorrect predictive determination;

(viii) adjusting the coefficient to reduce the selected index; and (ix) repeating steps (iii)-(viii) until the selected index satisfies a given value associated with that index.

3. The maintenance support method according to claim 1, wherein a weight is assigned to one of the first index $\alpha$ and the second index $\beta$ before the third index $\gamma$ is determined as sum of the first index $\alpha$ and the second index $\beta$.

4. The maintenance support system according to claim 2, wherein a weight is assigned to one of the first index $\alpha$ and the second index $\beta$ before the third index $\gamma$ is determined as sum of the first index $\alpha$ and the second index $\beta$.

5. The maintenance support system according to claim 2, wherein the plurality of detectors are configured to intermittently detect the state of each steam trap of the plurality of steam traps at a plurality of times during the preset time, wherein the one or more processors are further programmed or configured to:

generate the determination results regarding the states of the steam traps respectively for the detected detection signals, generate the maintenance information based on statistics regarding the determination results obtained during the preset time, and generate the predictive information based on the statistics regarding the determination results obtained during a period from the previous delivery of the maintenance information to the specified time.

6. The maintenance support system according to claim 2, wherein the one or more processors are further programmed or configured to:
   generate the determination results that include remaining battery charge of the detectors, and
   generate the maintenance information and the predictive information that include remaining battery charge of the detectors at a present time and predicted remaining battery charge of the detectors in the future.

7. The maintenance support system according to claim 2, wherein the time required for maintenance work on the plant has been set as a preset maintenance work time, and
wherein the one or more processors are further programmed or configured to:
   generate the determination results based on the detection signals that are detected after the preset maintenance work time has elapsed.

\* \* \* \* \*